United States Patent Office 3,222,667
Patented Dec. 7, 1965

3,222,667
CORE MATRIX FOR CONTROL OF CRT HAVING FORWARD AND REVERSE WOUND CORES
Alexander Woroncow, Havant, Jack S. Randall, Portsmouth, and Ralph Benjamin, Gosport, England, assignors to National Research Development Corporation, London, England, a British corporation
Filed Apr. 24, 1962, Ser. No. 189,914
3 Claims. (Cl. 340—324)

In many cases, there exists a requirement for writing symbols on a cathode-ray tube. Several methods of producing the symbols are possible and vary in complexity and in the resolution, clarity, and speed of writing of the symbols which they can produce. It is generally agreed that the fastest methods which give highest resolution rely on deflecting the spot on the C.R.T. in the appropriate manner so as to "draw" the symbol rather than scanning the area occupied by the symbol as in a television picture.

If a symbol writing equipment is used in conjunction with a computer which processes data at a very high rate, it would be desirable to write symbols in a time of the order of a few microseconds each. It may be necessary in this case to accept symbols which are not artistically perfect in order to simplify the necessary deflection waveforms.

If the symbols are composed of a few straight line sections, or "legs," it is possible to produce them at the required high speed. Further, the required waveforms can be generated and mixed using ferrite cores. All the numerals and most of the letters of the alphabet can be produced in recognisable form out of 6 legs, though some of the symbols have a somewhat crude appearance. With 10 legs all the numerals and letters can be produced in a very reasonable form.

In principle there is no limit to the number of legs apart from the required minimum time of writing, and the equipment can be made to generate a considerably greater number of legs without much additional complexity, thus producing more refined or complex symbols. For example it is possible to produce simple drawings of arbitrary shapes. The speeds with readily available transistors range from 0.5 to 2 microseconds per leg. Higher speeds would require faster, more powerful and thus more expensive transistors. It would appear that speeds of 0.2 to 0.25 microseconds per leg should be practical.

The equipment described below is fully transistorised and has been designed accordingly. Thermionic valves could have been used but would not have simplified the design. The equipment is suitable for use with magnetically or electrostatically deflected cathode ray tubes. Transistorised magnetic deflection circuits present some difficulties at high speeds because of the comparatively large power needed for deflection. This power is another limiting factor when the speed of writing and the size of the symbols are considered.

The details of the apparatus and its operation will be understood from the following description with reference to the accompanying drawings in which.

Figure 1:
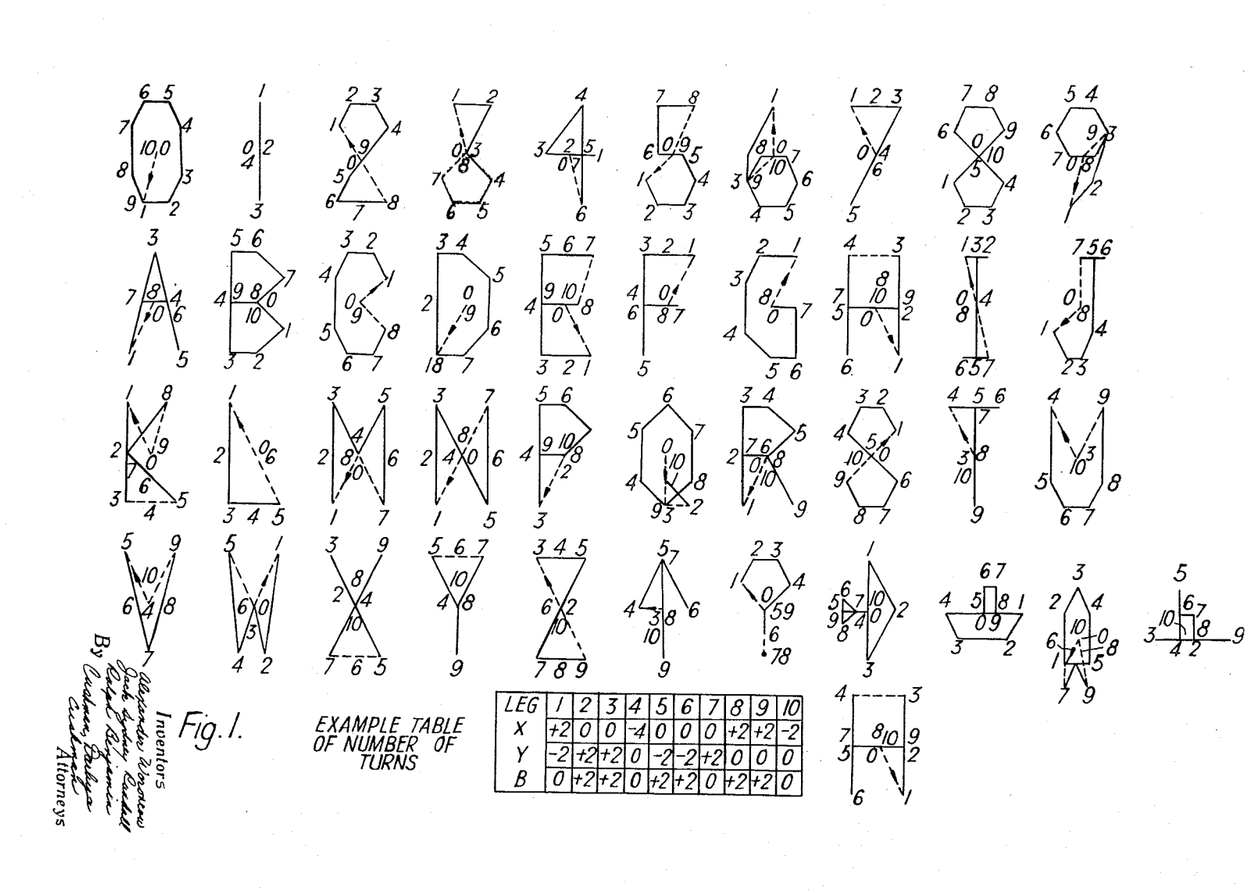
FIG. 1 shows diagrams of how different symbols are traced out on a C.R.T. screen and an example table of the spot deflections required to trace out the letter H.

Every spot deflection or "leg" may have components in X or Y co-ordinates or both and a brightening pulse. Every symbol traced out starts and finishes in the centre of the symbol, i.e., at 0 in each of the shapes illustrated in FIG. 1. The first leg is from 0 to 1, the next leg is to point 2 and so on until the writing spot returns to the centre at 0 on completion of the symbol. The return of the beam to the starting point is necessary, especially for magnetic deflection, so that the deflecting current in the coil starts and finishes at zero for every symbol. The legs of a symbol, in the equipment described, may have lengths whose X and Y components may be 0, 1, 2, 3 or 4 units. This range of magnitudes has been chose arbitrarily as it seems to fit the requirements for the desired symbols, but the relative magnitudes of the X and Y units, and the number of units available along the two axes can be varied if required. It will be seen from FIG. 1 that the units may have to be positive or negative, as required by the symbol shape.

A brightening pulse is produced only for those legs which have to be seen in the symbol. Some legs are not brightened and are thus invisible; they are shown dotted in FIG. 1. If a symbol is written only once, or if the repetition frequency is very low, longer legs require stronger brightening pulses in order to make a symbol appear evenly illuminated.

Figure 2:
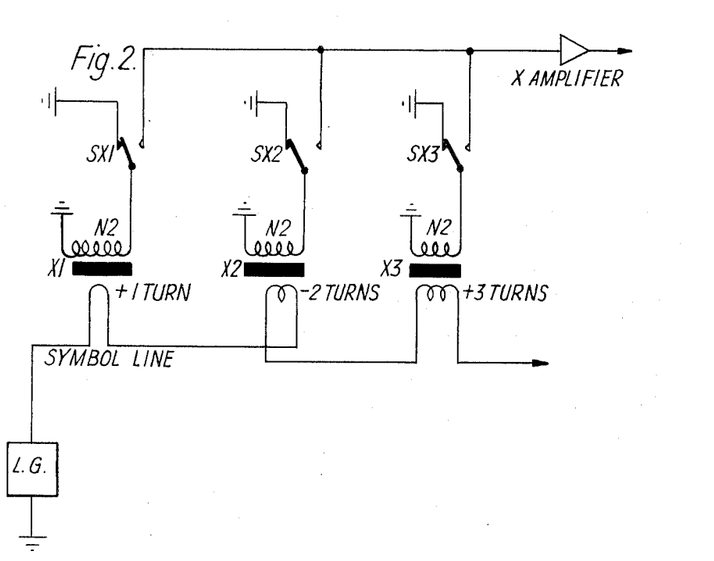
FIG. 2 is a diagram to illustrate a principle of operation.

All the waveforms are produced using magnetic cores with appropriate windings and diode switches. The principle of operation is illustrated in FIG. 2 showing the production of the X waveform. The corresponding Y waveform and brightening pulse (B.P.) are produced in a similar manner. If the equipment is designed to produce 10 legs there are 10 transformers for X, 10 for Y, and 10 for B.P. The symbol may utilise less than 10 legs, but, for simplicity in the equipment, time is allowed for all 10 legs although some may be of zero value. A suitable material for the transformer cores is soft ferrite of medium grade, and a convenient shape is tubular. The secondary winding of every core has a comparatively large number of turns, $N_2$, of the order of 100. A line generator, L.G., produces a pulse of current of about 10–30 ma. in a wire called the symbol line. This pulse lasts during the whole cycle of operations for generating a 10-legged symbol. If the first leg of the symbol has an X component of +1 unit, the symbol line is threaded once through the core X1, in a positive sense (arbitrarily chosen) and forms the primary winding of 1 turn. If the second leg of the symbol has an X component of —2 units the symbol line continues through the core X2 and is threaded twice in the negative sense, and so on for the remainder of the X cores, Y and B.P. cores, forming a series of primary windings. The secondary windings are shorted to earth, and secondary currents of constant magnitude persist as long as the constant primary current flows. In the above example, the current in the secondary of X2 will of course be twice that of X1 and in the opposite direction. Since the B.P. is unidirectional, only one sense of winding is required on B.P. cores. Every symbol has its corresponding symbol line, and only one line at a time may be energised. Before the symbol starts to be drawn, the symbol line current and all secondary currents must reach their steady value. This takes a fraction of a microsecond. The first leg is then drawn by diverting the X1 secondary current into the amplifier by means of switch SX1. At the same time similar switches operate for the Y1 and B.P.1 and their respective amplifiers. The currents for the first leg are switched into the amplifiers for a predetermined length of time, say 1 microsecond, and then switched back to earth, whereupon secondary currents for the second leg are switched into the amplifiers for 1 microsecond, and so on until all the required number of legs are completed. The symbol line current is then cut off, and the cores take some time to recover. After this time another symbol may be drawn by the selection of the appropriate symbol line and repeating the operations.

The details of the circuits used in the equipment outlined above will now be discussed more fully.

Figure 3:
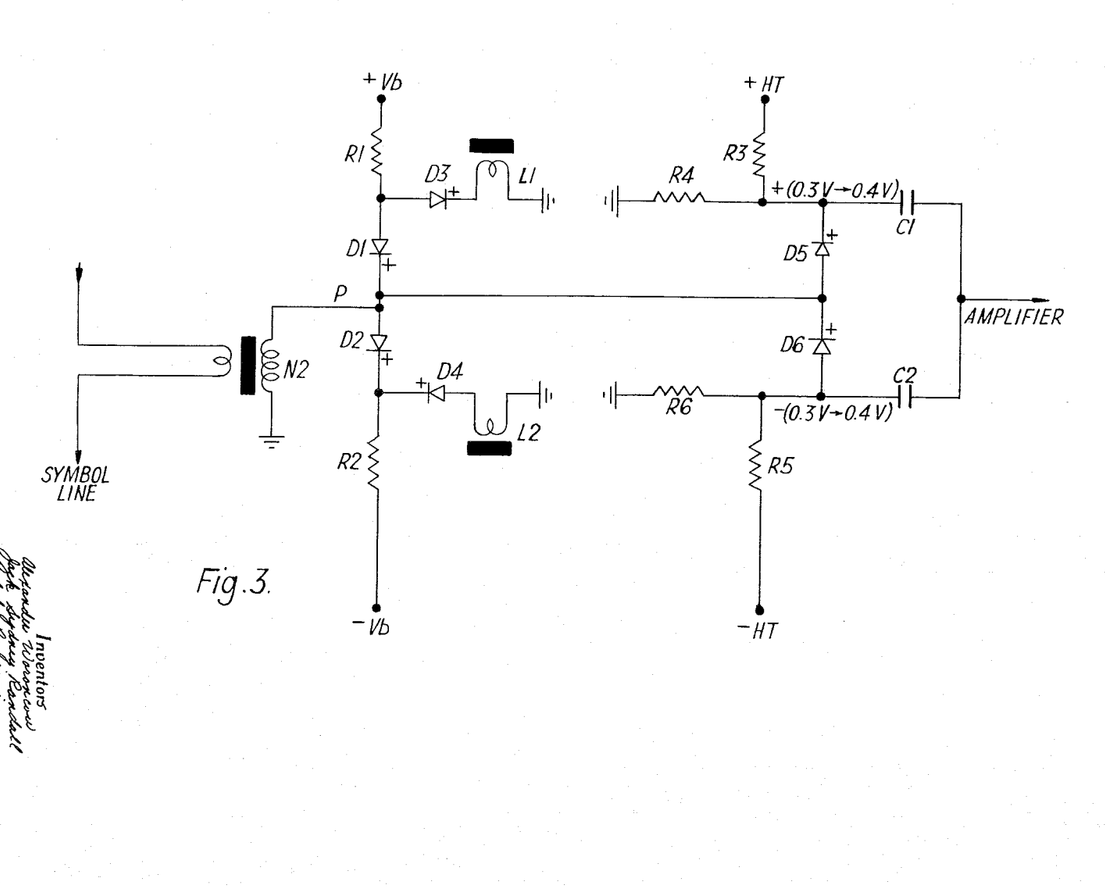
FIG. 3 is an outline circuit diagram of each (diode) switch.

The secondary current of the transformer producing a leg can be of either polarity and the diode switch represented by SX1, SX2, etc. in FIG. 2 has to be capable of switching such a current. The principle of operation of the switch is shown in FIG. 3. Normally the diodes D1, D2, D3 and D4 are conducting a current of magnitude determined by resistors R1 and R2 fed from bias voltage sources $+V_b$ and $-V_b$. The biasing voltages are preferably pulsed as described later and derived from the pulse generators of FIG. 8. The currents through the diodes have to be large enough to accommodate the secondary current from the winding N2. The diodes D1–D3 and D2–D4 have to be of similar characteristics in order to make the junction point, P, of the diodes D1 and D2 as near to earth potential as possible when all the diodes are conducting. Normally, it suffices that the diodes D1–D3 and D2–D4 are of the same type. It is possible to replace D3 and D4 by resistors, but allowance has then to be made for variation of the voltage drop across these resistors, whereas the voltage drop across the diodes is more constant. If it is assumed that the resistance of the diodes is negligible, the secondary current flows to the virtual earth at "P."

At this time diodes D5 and D6 are not conducting because of the small reverse voltage (0.3 to 0.4 v.) applied from the resistors chains R3–R4 and R5–R6.

During the time when the leg is being drawn, the secondary current from N2 has to be diverted into the amplifier. This is achieved by making D1 and D2 non-conducting by applying to them a reverse voltage of about 1.5 v. via D3 and D4 respectively from the windings $L_1$ and $L_2$ of the blocking voltage generator of FIG. 4. It will be noticed that at this point while diodes D1 and D2 are non-conducting, diodes D3 and D4 are conducting even more heavily. The secondary winding N2 now builds up a voltage to overcome the reverse bias on D5 or D6, depending on the direction of secondary current. Resistors R3, R4 or R5, R6 represent a high impedance compared with capacitor C1 or C2, and the secondary current flows to the amplifier. When the time for the writing of the leg is over, the voltages from the $L_1$ and $L_2$ windings are removed, and the original situation is restored where no secondary current from N2 flows into the amplifier.

It has been assumed that the resistance of the diodes in the conducting state is negligible. In fact the effective resistance of a diode is a few hundred or many tens of ohms. This resistance must be small in comparison with the impedance of the secondary winding N2, and thus this winding must have many turns, about 100. Also, the secondary current must maintain a virtually constant value not only during one leg, but during the whole period of writing a symbol. This requirement corresponds to a large time constant $L/R$, though both L and R are here non-linear quantities, and any meaningful numerical expression would be difficult to obtain.

Figure 4:
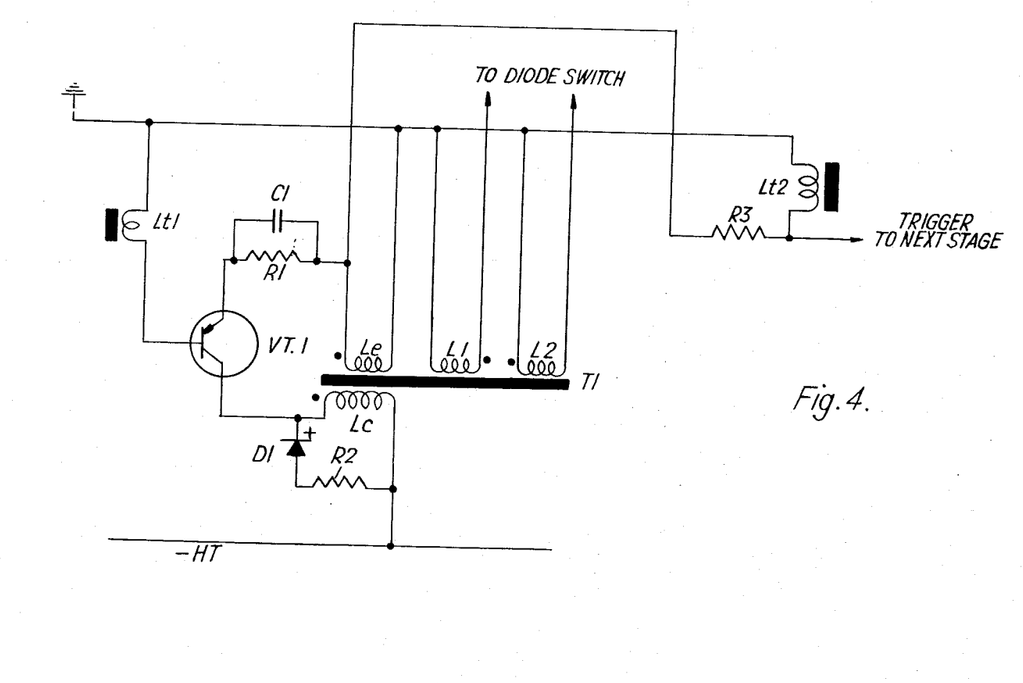
FIG. 4 is a circuit of the blocking oscillator for operation of the diode switches.

Switching voltages for operating the diode switches of each leg are generated by a single pulse blocking oscillator, as shown in FIG. 4. This blocking oscillator produces a single pulse when triggered, but otherwise is quiescent and draws no current. A trigger pulse is applied to the base of the transistor via winding L1. This pulse has a minimum value of about 0.2 v. When the oscillator is triggered, the transistor becomes conductive and the collector is bottomed. The winding, $L_e$, of the ferrite cored transformer T1, develops about 1 volt and supplies current to the emitter via resistor R1. Capacitor C1 is present to speed up the transient.

The current in the collector grows approximately linearly until it reaches very nearly the same value as that of the emitter. The exact value depends on the alpha of the transistor. When the collector current stops growing, the E.M.F.'s in the windings disappear and the emitter current is cut off. The collector winding produces a reverse voltage when the current is interrupted which represents a voltage additional to the H.T. applied to the transistor. This voltage is limited by the diode D1 and resistor R2, the lower the value of R2 the lower the over-voltage but the longer the recovery time. A suitable value of R2 must be chosen with regard to acceptable over-voltage and recovery time. During the pulse E.M.F's. are generated in the windings L1 and L2 and provide the blocking voltages for the diode switch. The square pulse generated by the blocking oscillator is differentiated by R3 and $Lt2$ to provide a negative trigger pulse at the trailing edge for the next blocking oscillator of a chain of such pulse generators which are represented by the blocks B.O. in FIG. 5 (top row) described below.

It will be seen that the length of the generated pulse depends on the transformer T1 and resistor R1. With a fixed design of transformer the length of the pulse can be decreased by increasing R1 and vice versa. This property makes this blocking oscillator a convenient means of obtaining a pulse of adjustable length or a variable time delay. The pulse length is almost independent of the H.T. variations and the transistor used. The circuit in the form shown in FIG. 4 may be triggered by excessive noise on the H.T. or earth line. This can be prevented by desensitising the blocking oscillator by a small negative bias on the emitter. The trigger pulse would then have to be stronger.

A symbol writing equipment built on the principles described above can be quite versatile. One particular version of the equipment and its refinements is described below and produces symbols utilising up to 10 legs, of 1 microsecond each leg, on a 15 kv. magnetically deflected tube of 12 in. diameter. The height of the symbols is up to ⅜ in. A block diagram of the equipment is shown in FIG. 5.

Figure 5:
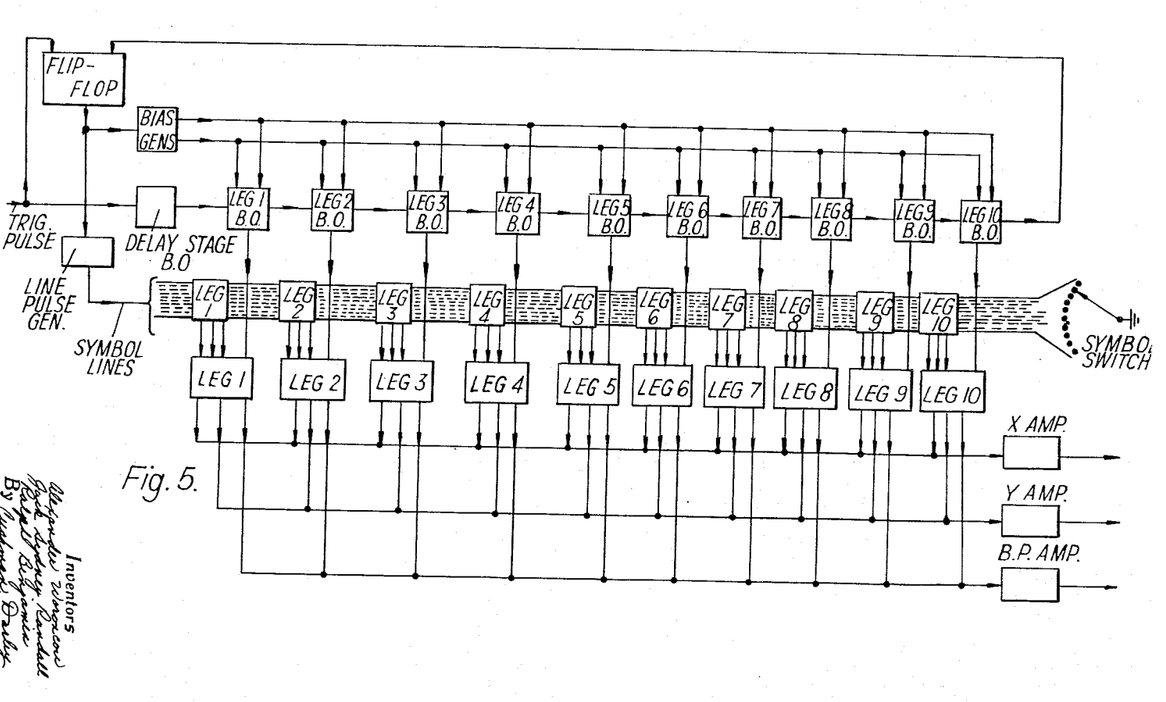
FIG. 5 is a block diagram of equipment embodying the elements described.

In FIG. 5 the row of smaller blocks or boxes along the middle of the figure and labelled Leg 1, Leg 2, etc., represent the symbol transformers such as N₂ of FIGS. 2 and 3 with the symbol lines threaded through them. The larger blocks or boxes labelled Leg 1, Leg 2, etc. in the lowermost row, each represent the diode switches illustrated in FIG. 3 or in the right hand part of FIG. 6, whilst the top row of boxes labelled leg 1 B.O., Leg 2 B.O. etc. represents the chain of blocking oscillators, each of which is as illustrated in FIG. 4 or in the left hand part of FIG. 6.

Figure 7:
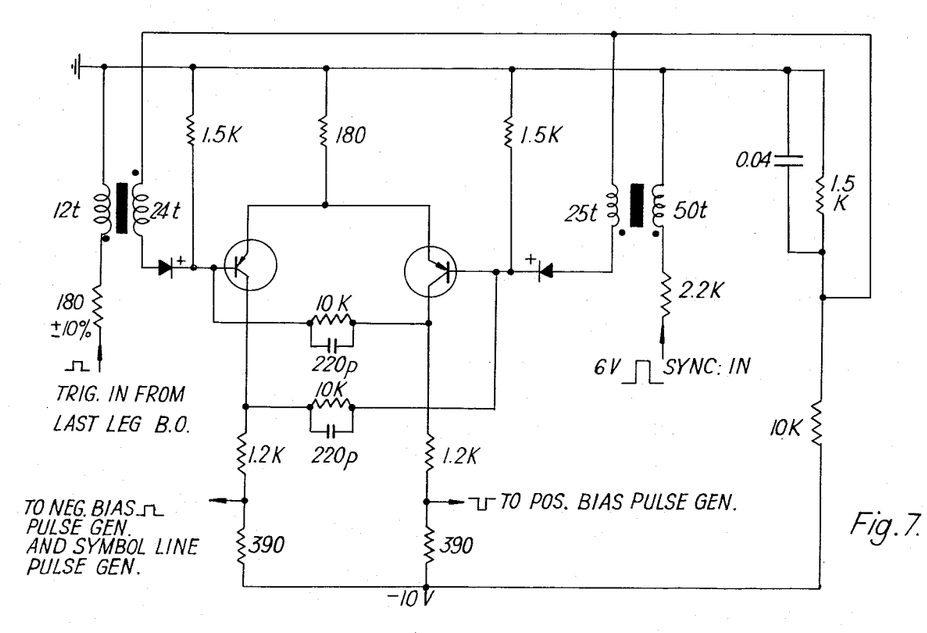
FIGS. 7, 8 and 9 are circuits of pulse generators used in the equipment.
Figure 8:
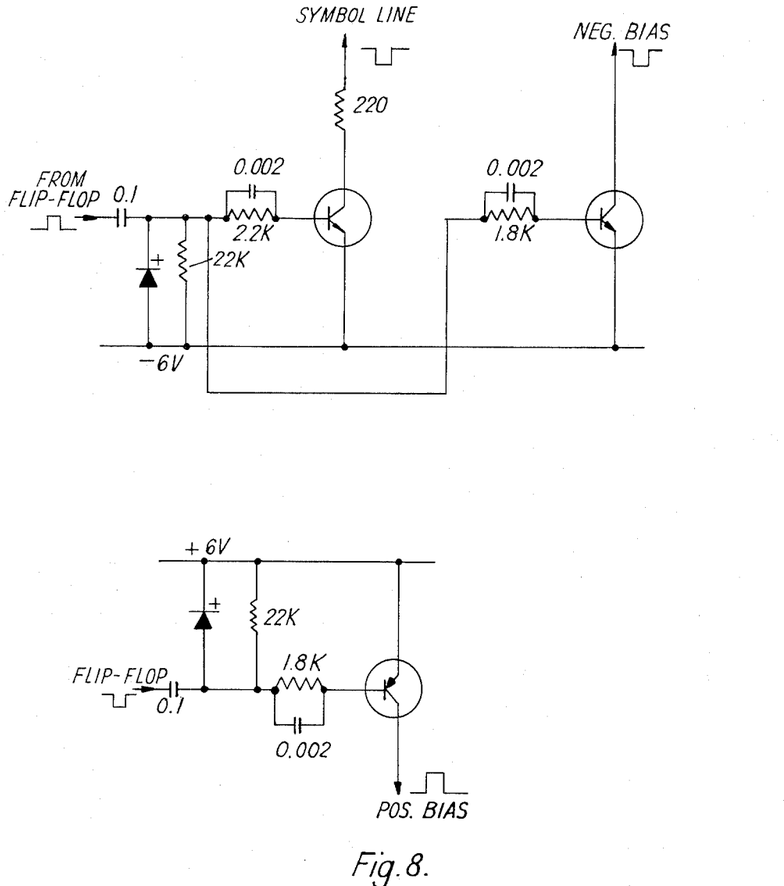
Figure 9:
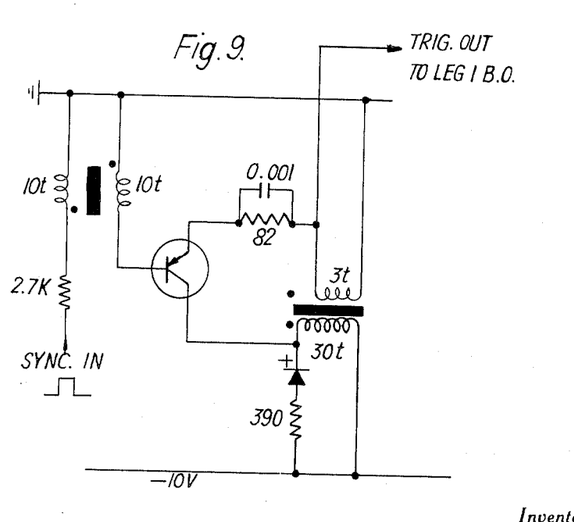
Figure 10:
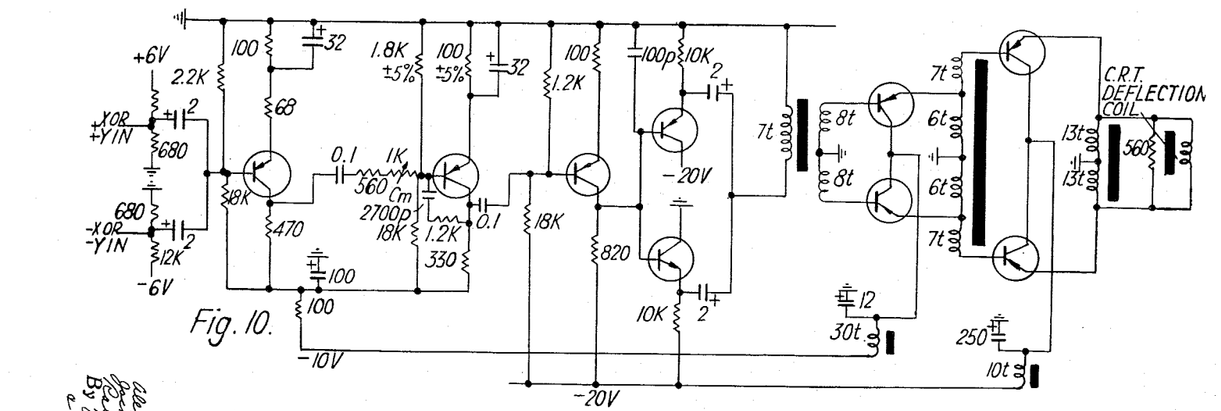
FIG. 10 is a circuit diagram of an X or Y amplifier for the C.R.T.
Figure 11:
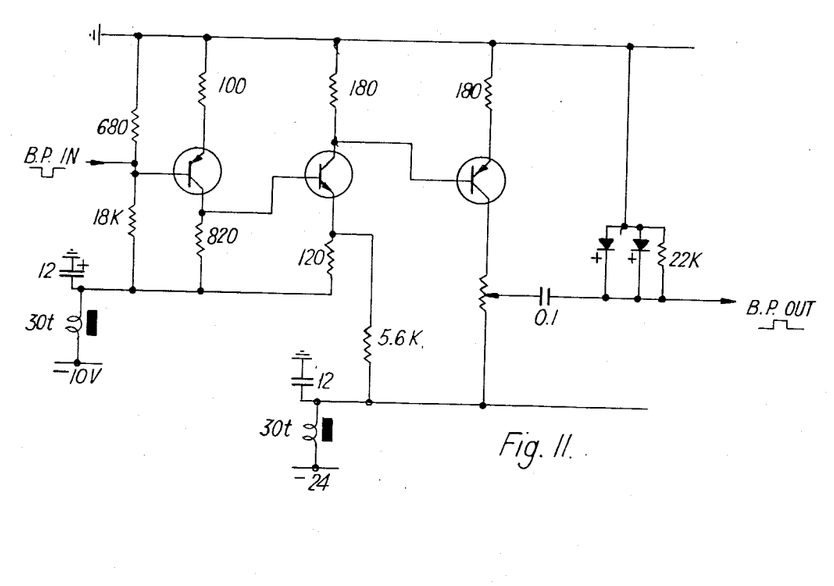
FIG. 11 is a circuit diagram of the brightening pulse amplifier.

The details represented by the boxes labelled "Line Pulse Gen." and "Bias Gen." are illustrated in FIG. 8, the box labelled Flip-Flop represents the details illustrated in FIG. 7, and the box labelled "Delay stage B.O." represents the features of FIG. 9. FIG. 10 shows the details represented by the block marked X amplifier or Y amplifier in FIG. 5, whilst FIG. 11 shows the details of the block labelled B.P. amplifier.

The symbol required is selected by a Symbol Selector Switch, which may be mechanical or electronic. When the symbol has been selected, a trigger pulse is applied to the equipment to start the symbol writing cycle of operations. After the completion of the symbol the equipment takes about 2 to 3 microseconds to recover and be ready to receive another trigger pulse. During the recovery time, another symbol can be selected.

The trigger pulse operates on the delay stage which is followed by a string of blocking oscillators (B.O.'s.) associated with legs 1-10. The trigger pulse also switches "on" a flip-flop which controls the positive and negative bias generators and the line pulse generator. The flip-flop is switched "off" by a pulse occurring at the end of the last leg. The delay stage is necessary to allow the line pulse and biases to reach their steady values. The bias supplies are switched on only for the length of time of generating a symbol in order that the X1 etc. cores should make a faster recovery. With permanent bias supplies the recovery takes some tens of microseconds but with pulsed bias supplied the recovery takes only 2–3 microseconds because of the higher voltages which must then be generated during the recovery period.

For testing purposes it is convenient to provide some sort of trigger pulse generator and a manual symbol selector switch. These are not essential to the basic working of the system and will not be considered further.

In FIG. 5 the blocks marked Leg 1, 2 etc. comprise the blocking oscillator, the diode switches, and X, Y and B.P. symbol transformers.

The cores for the symbol transformers are tubular ½ in. long, ½ in. O.D., ¼ in. I.D. The material is cut from ferrite tube, a standard product. Cores of slightly larger inside and outside diameters would be more convenient for wiring, but would have to be made to order. The grade of material is not critical but the cores have to be of equal permeability to within ±20%, and this should be checked before use. Cores with a very sub-standard permeability, probably due to imperfections, could cause distortions of the symbols. With 1 microsecond legs, a suitable number of turns for the secondaries of the symbol transformers is 120. This number might be somewhat reduced for shorter legs. The primary current in the symbol line is 25 ma. With less current there is too little energy transmitted in the signal, and it is more difficult to produce undistorted symbols. More primary current would be advantageous but the current handling capacity of the electronic symbol-selection switch used sets an upper limit.

Figure 6:
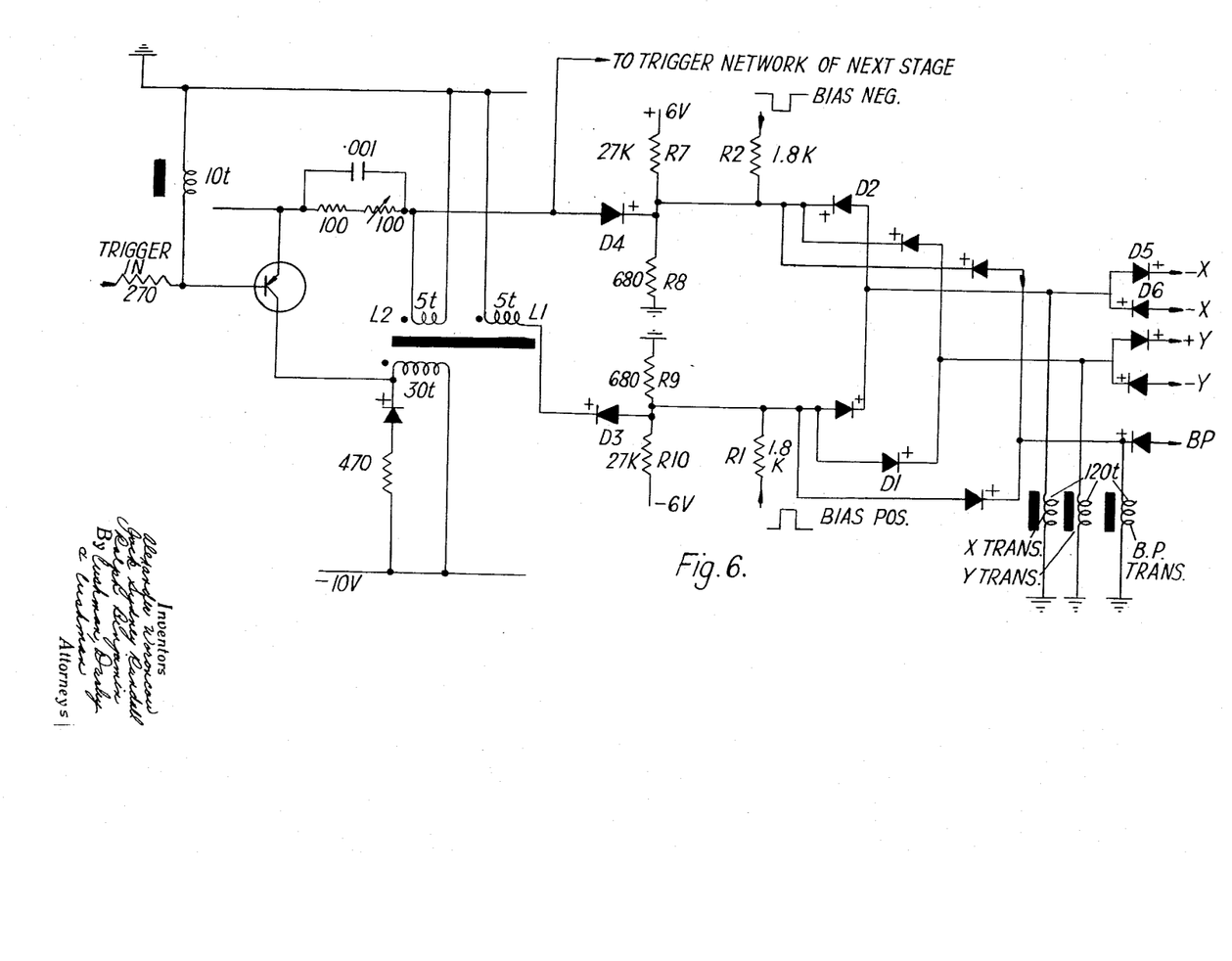
FIG. 6 is a detailed diagram of the blocking oscillator and diode switch.

The arrangement of the diode switch, FIG. 6, is as explained in the basic principles of operation. Fast point-contact diodes are used throughout. It has been found that although junction diodes have the advantage of a lower forward impedance, they exhibit an appreciable hole storage effect, and are too slow in cutting off the current to the amplifiers. The point-contact diodes should have low reverse leakage current and forward resistance. Ideally the diodes should be matched, but in practice large differences can be tolerated without spoiling the shape of the symbols too much. The diodes are conditioned for fast recovery times as above described, by pulsed bias voltages derived from the apparatus of FIG. 8.

The resistors R7–R8 and R9–R10, FIG. 6, provide a reverse bias of about 150 mv. which ensures that the low impedance virtual earth via D1 and D2 is removed when the pulsed bias ends, and the recovery of the symbol cores is speeded up to some 2–3 microseconds.

The cores used in the blocking oscillators are ferrite rings ½ in. O.D., ¼ in. I.D., and ⅛ in. thick. The numbers of winding turns are as shown in FIG. 6. The 100 ohm potentiometer is provided as a convenient means of adjusting the duration of a leg to 1 microsecond and allows for variation of magnetic properties of the cores.

The circuit diagram of the flip-flop is shown in FIG. 7. The resistors associated with the flip-flop itself should have ±5% tolerance to ensure that the transistor in the conducting state is not "bottomed." Otherwise the switching off time is lengthened and the loading of the trigger pulse is greater. The triggers are applied inductively via transformers wound on ferrite rings ½ in. O.D., ¼ in. I.D., and ⅛ in. thick. The main sync or trigger pulse is about 6 v. positive and the transformer is wound to accommodate this pulse and trigger on the leading edge. These conditions can be varied if necessary. The transformer associated with the trigger pulse from the last B.O. in the chain of 10 is wound to trigger the flip-flop on the trailing edge.

Pulses from the flip-flop control the symbol line and bias pulse generators, FIG. 8, to give the bias pulses so marked in FIG. 6 equivalent to $V_b$ of FIG. 3. The capacitances across the base resistors are included to sharpen the leading edges of the output pulses. The delay stage blocking oscillator, FIG. 9, is similar to the other blocking oscillators. The length of pulse is fixed, and has only to be longer than the transients in the symbol line and bias circuits.

The circuit of the X and Y amplifiers is given in FIG. 10. At the input to the amplifier is fed the stepped waveform of a symbol and essentially the same amplified waveform is applied in push-pull to the C.R.T. deflecting coil. The coil performs the function of integration on the stepped waveform so that sawteeth of current cause the C.R.T. spot to be deflected in straight lines. Because the deflection coil is not a pure inductance but has some resistance the waveforms have a slight correction introduced in the second stage. This stage is a negative feed-back Miller circuit, and the stepped waveform has some appropriate value of sawtooth component added by means of the Condenser Cm. The positive and negative portions of the symbol waveforms are equal in area, so that the spot starts and finishes in the centre of the symbol. This fact allows A.C. coupling connection in the amplifier where necessary.

The transformers are wound on ferrite cores of tubular shape similar to those of the symbol transformers. Each core consists of 2 tubes 1 in. long side by side, and threading the wire through both tubes constitutes a single turn. This shape of core reduces leakage inductance which could give rise to troublesome ringing. Ringing is also reduced by the damping resistors shown. The required aspect ratio $Y:X$ is normally greater than unity, so the gain of the Y amplifier is greater than the X. The required voltage and current gains in the later stages are achieved using emitter followers driving transformers. The coupling back to the non-conducting half of the push-pull circuit ensures that the base emitter reverse voltage rating is not exceeded, and finally enables double the H.T. voltage to be applied to the deflection coil.

The circuit diagram of the brightening pulse amplifier is shown in FIG. 11. The input consists of unidirectional pulses and the amplifier has to be D.C. coupled in the early stages. D.C. restoration is not effective on low level pulses owing to the appreciable voltage drop on diodes. Fast transistors have to be used because, unlike the X and Y waveforms which are integrated, the B.P. retains its square pulse character and the high frequency components have to be retained in order to avoid uneven brightening of the legs. Phase shifting which would cause a missed portion of a leg, followed perhaps by brightening a part of what should be an invisible leg, has also to be avoided. In general the present circuit has been chosen for simplicity and low standing current. Other arrangements, however, could be devised especially if it is thought undesirable to use the expensive silicon transistor, of if variable amplitude brightening pulses were necessary as mentioned above.

We claim:

1. Apparatus for the generation and display of visual symbols on the screen of a cathode ray tube by a succession of straight line motions of a spot scanning said screen, comprising a set of magnetic cores energizable for the storage of energy for effecting horizontal component (X) deflections of the scanning spot, another set of magnetic cores energizable for the storage of energy for effecting vertical component (Y) deflections of said spot, and a third set of magnetic cores energizable for the storage of brightness control (B) pulses for rendering visible the straight line motions of said spot which contribute to the building up of the symbol outline, core energizing wires interwoven through said cores forwardly or reversely one or more times in accordance with the directions and magnitudes of X and Y deflections and the visibility thereof required to build up representation of a symbol, a pulse generator connectible to a selected wire to energize the cores looped by said selected wire to the magnitudes and polarities appropriate to successive scanning spot movements to trace out a symbol, a normally closed output winding on each core, switching diodes connected to each said output winding, and pulse generators operable in turn to switch the diodes to connect at the same time the outputs from corresponding cores of each set to produce deflection and brightening of the traces of the successive straight lines on the cathode ray tube screen and to disconnect said outputs and trigger operation of the pulse generator controlling the switching of the core outputs for writing a succeeding trace until the whole symbol outline has been thus built up.

2. Apparatus as claimed in claim 1, wherein the switching diodes are conditioned for fast recovery time by biasing voltages applied to them only for the time of generation of each symbol.

3. Apparatus as claimed in claim 1, wherein triggering of the first one of a chain of pulse generators controlling the switching of the energized core outputs is through a delay stage to ensure steadiness of core energizations and switching diode biasing voltages before the core output switchings are begun.

References Cited by the Examiner
UNITED STATES PATENTS

| | | | |
|---|---|---|---|
| 2,766,444 | 10/1956 | Sheftman | 340—324.1 |
| 2,931,022 | 3/1960 | Triest | 340—324.1 |
| 3,020,530 | 2/1962 | Volberg | 340—324.1 |
| 3,024,454 | 3/1962 | Chaimowicz | 340—324.1 |
| 3,047,851 | 7/1962 | Palmiter | 340—324.1 |
| 3,090,041 | 5/1963 | Dell | 340—324.1 |

NEIL C. READ, *Primary Examiner.*